(12) United States Patent
Kim

(10) Patent No.: US 7,486,827 B2
(45) Date of Patent: Feb. 3, 2009

(54) EFFICIENT AND ROBUST ALGORITHM FOR VIDEO SEQUENCE MATCHING

(75) Inventor: Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 751 days.

(21) Appl. No.: 11/040,569

(22) Filed: Jan. 21, 2005

(65) Prior Publication Data

US 2006/0182368 A1 Aug. 17, 2006

(51) Int. Cl.
*G06K 9/00* (2006.01)
*G06K 9/62* (2006.01)
*G06K 9/54* (2006.01)
*G06K 9/60* (2006.01)
*G06F 7/00* (2006.01)
*G06F 17/30* (2006.01)
*G11C 11/34* (2006.01)
*G11C 16/04* (2006.01)

(52) U.S. Cl. ............... 382/209; 382/107; 382/305; 382/100; 707/1; 365/185.04

(58) Field of Classification Search .......... None
See application file for complete search history.

(56) References Cited

U.S. PATENT DOCUMENTS

| | | | |
|---|---|---|---|
| 5,933,499 A | 8/1999 | Enari | |
| 5,960,081 A * | 9/1999 | Vynne et al. | 713/176 |
| 5,987,456 A | 11/1999 | Ravela et al. | |
| 6,070,171 A | 5/2000 | Snyder et al. | |
| 6,141,464 A | 10/2000 | Handley | |
| 6,240,423 B1 | 5/2001 | Hirata | |
| 6,266,429 B1 * | 7/2001 | Lord et al. | 382/100 |
| 6,285,774 B1 | 9/2001 | Schumann et al. | |
| 6,285,995 B1 | 9/2001 | Abdel-Mottaleb et al. | |
| 6,332,030 B1 | 12/2001 | Manjunath et al. | |
| 6,347,144 B1 | 2/2002 | Park | |
| 6,373,979 B1 | 4/2002 | Wang | |
| 6,381,367 B1 | 4/2002 | Ryan | |
| 6,389,417 B1 | 5/2002 | Shin et al. | |
| 6,404,925 B1 * | 6/2002 | Foote et al. | 382/224 |
| 6,487,311 B1 | 11/2002 | Gal et al. | |
| 6,577,766 B1 | 6/2003 | Standridge | |

(Continued)

FOREIGN PATENT DOCUMENTS

EP    1 345 160    9/2003

(Continued)

OTHER PUBLICATIONS

Kim et al. "An Efficient Algorithm for Video Sequence Matching Using the Modified Hausdorff Distance and the Directed Divergence" IEEE Transactions on Circuits and Systems for Video Technology, vol. 12, No. 7, Jul. 2002, pp. 592-596.*

(Continued)

*Primary Examiner*—Vikkram Bali
*Assistant Examiner*—Mia M Thomas

(57) ABSTRACT

A two-step matching technique is embodied in a video-copy-detection algorithm that detects copies of video sequences. The two-step matching technique uses ordinal signatures of frame partitions and their differences from partition mean values. The algorithm of this invention is not only robust to intensity/color variations it can also effectively handle various format conversions, thereby providing robustness regardless of the video dynamics of the frame shots.

6 Claims, 5 Drawing Sheets

U.S. PATENT DOCUMENTS

| | | | |
|---|---|---|---|
| 6,675,174 B1 | 1/2004 | Bolle et al. | |
| 6,751,363 B1* | 6/2004 | Natsev et al. | 382/305 |
| 6,930,803 B1* | 8/2005 | Suzuki | 358/471 |
| 6,990,233 B2* | 1/2006 | Park et al. | 382/164 |
| 7,127,106 B1* | 10/2006 | Neil et al. | 382/181 |
| 7,167,574 B2* | 1/2007 | Kim | 382/100 |
| 2001/0046332 A1 | 11/2001 | Chang | |
| 2002/0186305 A1* | 12/2002 | Atkin | 348/222.1 |
| 2003/0033347 A1 | 2/2003 | Bolle et al. | |
| 2003/0174859 A1* | 9/2003 | Kim | 382/100 |
| 2004/0013302 A1* | 1/2004 | Ma et al. | 382/209 |
| 2004/0258397 A1* | 12/2004 | Kim | 386/94 |

FOREIGN PATENT DOCUMENTS

| | | |
|---|---|---|
| GB | 2 267 598 | 12/1993 |
| JP | 1345160 A2 * | 9/2003 |
| JP | 2004-7552 | 1/2004 |

OTHER PUBLICATIONS

Hampapur et al. "Comparison of Sequence Matching Techniques for Video Copy Detection" Proceedings of SPIE, vol. 4676, pp. 194-201 or pp. 1-8, Dec. 2001.*

Kim et al__An Efficient Algorithm for Video Sequence Matching Using the Modified Hausdoff Distance and Directed Divergence__IEEE Transactions on Circuits and Systems for Video Technology, Jan. 2000, pp. 592-596.*

Rao et al__View Invariant Alignment and Matching Video Sequences__pp. 1-7.*

Zhu et al__A New Diamond Search Algorithm for Fast Block Matching Motin Estimation__IEEE Transactions on Image Processing, Vo.. 9, No. 2. Feb. 2000, pp. 287-290.*

"Video Copy Detection Using Spatio-Temporal Sequence Matching", C. Kim, *Storage and Retrieval Methods and Applications for Multimedia 2004*, vol. 5307, Jan. 2004, pp. 70-79.

"An Efficient Algorithm for Video Sequence Matching Using the Modified Hausdorff Distance and the Directed Divergence", S. Kim, et al., *IEEE Transactions on Circuits and Systems for Video Technology*, vol. 12, No. 7, Jul. 2002, pp. 592-596.

"Comparison of Sequence Matching Techniques for Video Copy Detection", A. Hampapur, et al., *Storage and Retrieval for Media Databases 2002*, SPIE vol. 4676, Dec. 2001, pp. 194-201.

"Video Sequence Matching", R. Mohan, *Proceedings of the 1998 IEEE International Conference on Acoustics, Speech and Signal Processing*, vol. 6, May 1998, pp. 3697-3700.

"Rime: A Replicated Image Detector for the World-Wide-Web," E. Chang, et al., in *Proc. SPIE Multimedia Storage and Archiving Systems III*, Nov. 1998.

"Ordinal Measure of DCT Coefficients for Image Correspondence and Its Application to Copy Detection", C. Kim, in *Proc. SPIE-5021 Storage and Retrieval for Media Databases 2003*, pp. 199-210, Santa Clara, Jan. 2003.

"Content-Based Image Copy Detection," C. Kim, *Signal Processing: Image Communication*, vol. 18 (3), pp. 169-184, Mar. 2003.

"Feature Based Indexing For Media Tracking," A Hampapur, in *Proc. IEEE International Conference on Multimedia and Expo* (ICME), pp. 67-70, 2000.

"A Novel Scheme for Fast and Efficient Video Sequence Matching using Compact Signatures," M. R. Naphade, et al., in *Proc. SPIE conference on Storage and Retrieval for Media Databases*, SPIE vol. 3972, pp. 564-572, Jan. 2000.

"Ordinal Measures for Image Correspondence," D. N. Bhat, et al., *IEEE Trans. Pattern Analysis and Machine Intelligence*, vol. 20, No. 4, Apr. 1998, pp. 415-423.

"Ordinal Measures for Visual Correspondence," D. N. Bhat, et al., Columbia Univ., Computer Science, Tech. Rep. CUCS-009-96, Feb. 1996.

Kim, C., et al., "Spatiotemporal Sequence Matching for Efficient Video Copy Detection", IEEE Transactions on Circuits and Systems for Video Technology, vol. 15, No. 1, Jan. 2005, pp. 127-132.

Hsu, W., et al., "An Integrated Color-Spatial Approach to Content-based Image Retrieval", in Proc. ACM Multimedia, 1995, pp. 305-313.

A. K. Jain, et al., "Query by Video Clip", Multimedia Systems Journal, vol. 7, No. 5, 1999, pp. 369-384.

Swain, M., et al., "Color Indexing", International Journal of Computer Vision, vol. 7, No. 1, 1991, pp. 11-32.

Lau, T.K., et al., "Performance Analysis of Clustering Algorithms for Information Retrieval in Image Databases", Neural Networks Proceedings, 1998, IEEE World Congress on Computational Intelligence. vol. 2, May 4-9, 1998, pp. 932-937.

"Comparison of Distance Measures for Video Copy Detection", Arun Hampapus and Ruud M. Bolle, in *Proc. IEEE International Conference on Multimedia and Expo* (ICME), 2001.

* cited by examiner

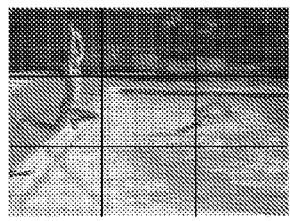
FIG. 1A
| 64 | 61 | 46 |
|----|----|----|
| 135 | 146 | 116 |
| 185 | 174 | 145 |
FIG. 1B
$$\begin{bmatrix} 3 & 2 & 1 \\ 5 & 7 & 4 \\ 9 & 8 & 6 \end{bmatrix}$$
FIG. 1C
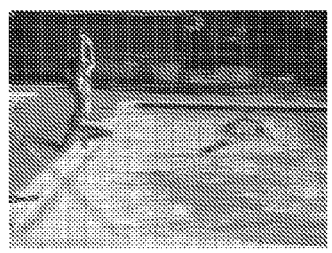
FIG. 2A
FIG. 2B
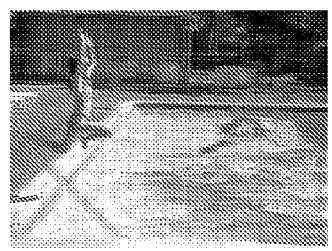
FIG. 2C
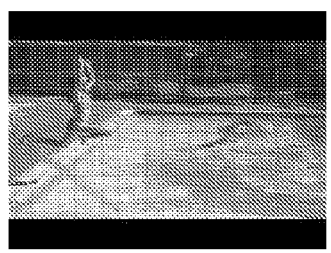
FIG. 2D
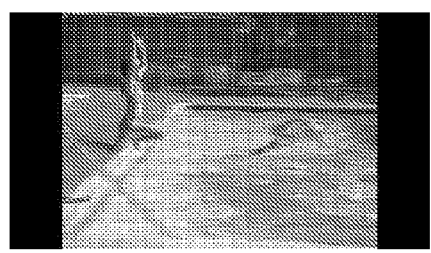
FIG. 2E

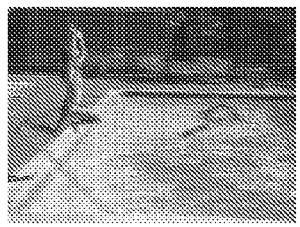 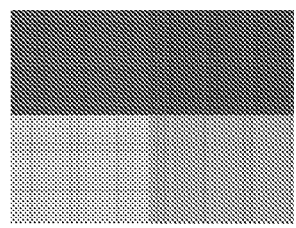 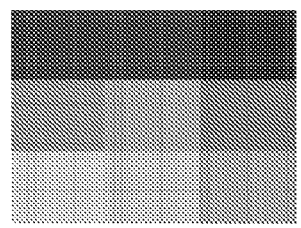
FIG. 3A-1          FIG. 3A-2          FIG. 3A-3
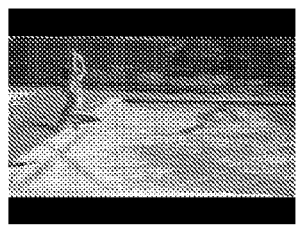 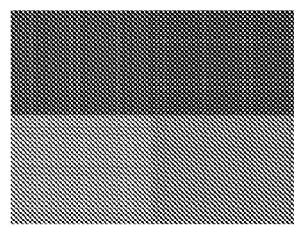 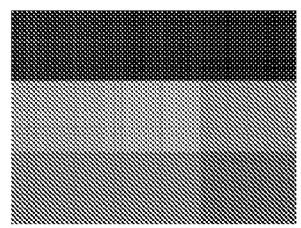
FIG. 3B-1          FIG. 3B-2          FIG. 3B-3
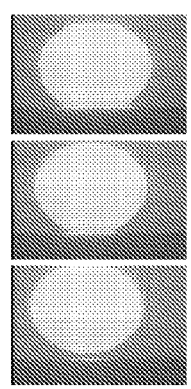 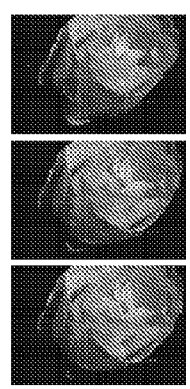 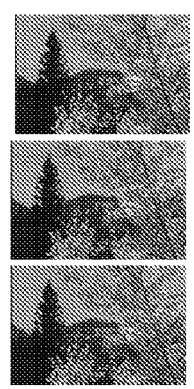  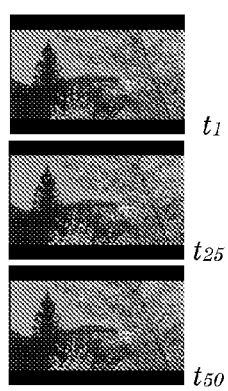
(A)         (B)         (C)         (D)         (E)
FIG. 4

US 7,486,827 B2

EFFICIENT AND ROBUST ALGORITHM FOR VIDEO SEQUENCE MATCHING

CROSS REFERENCE TO RELATED APPLICATIONS

This application is related to (1) application Ser. No. 10/778,464, filed Feb. 13, 2004 and entitled "Method and Apparatus for Video Copy Detection", and (2) application Ser. No. 10/263,423, filed Oct. 1, 2002 and entitled "Method and Apparatus for Content-Based Image Copy Detection." The content of each of these applications is incorporated by reference herein.

BACKGROUND OF THE INVENTION

1. Field of the Invention

The present invention relates generally to digital video technology and more particularly to matching techniques for detecting copies of a video using spatial and temporal factors. The techniques may be realized as methods, various steps/aspects of which may be performed by an appropriately configured apparatus, or may be embodied as a program of instructions, e.g., in the form of software on a device-readable medium.

2. Description of the Related Art

The ubiquitous nature of the Internet and the widespread availability of cost-effective digital storage has made copying, transmitting and storage of digital media almost effortless. As these tasks have become easier, protecting the Intellectual Property Rights (IPR) of such media has become more important. Detecting copies of digital media (images, audio and video) has become a crucial component in the effort to protect the IPR of digital content. Indeed, IPR is one of the main driving forces behind newly proposed standards regarding the copying of digital media, such as the proposed MPEG-21 standards. There are generally two approaches to digital media copy detection: watermarking and content-based copy detection.

Watermarking is a process that embeds information into the media prior to distribution. Thus, all legitimate copies of the content contain the identifying watermark, which can later be extracted to establish ownership.

Content-based copy detection, on the other hand, does not require additional information, beyond the media itself. Generally, an image or video contains enough unique information that can be used for detecting copies, especially illegal copies. Content-based copy detection schemes extract a signature from a test media, which is then compared to the signature extracted from the original media to determine if the test media is a copy of the original. The primary advantage of content-based copy detection over watermarking is the fact that no embedding is required before the media is distributed. Nevertheless, content-based copy detection schemes must also be sufficiently robust to properly handle media that has been modified by a third party for the purpose of avoiding copy detection.

Content-based copy detection algorithms have numerous uses. Such an algorithm can be employed in connection with a multimedia search engine to improve its retrieval efficiency by detecting and removing copies from the retrieval results before the search results are displayed. Content-based copy detection is also useful for media tracking, which involves keeping track of when and where a particular known piece of media has been used.

Color histogram-based methods, such as the histogram intersection method, have been used in content-based image/video retrieval systems. However, they are not suitable for copy detection systems since the color histogram does not preserve information about the spatial distribution of colors. The partition approach, which involves choosing a set of colors that describe all of the image colors and partitioning the image into sub-images, has been proposed. Here, the color information of each partition is obtained by a local color histogram. The similarity of two images is measured by comparing their local color histograms, and by considering the similarity of all the sub-images. However, the partition method comes with a high computational cost and requires a long search time. Additionally, this method will not detect images that have had their spatial outlay modified.

A sequence matching method, based on a set of key frames (or sub-sampled frames), has also been proposed. Although motion information is included with the key frames, it is not yet clear if the selected frames are appropriate to fully reflect the "action" within the video sequence. To match video clips, a variation of the method involving the intersection of linearized histograms of the DCT frames from the MPEG video was used. However, this technique did not address the variations between copies, such as signal modifications as well as display format conversions.

Another approach to matching video sequences is a correlation-based method, which is based on the sum of pixel differences between two image frames. Let $I_1$ and $I_2$ represent intensities in two image frames. There exists N tuples $(I_1^1, I_2^1), \ldots, (I_1'', I_2''), \ldots, (I_1^N, I_2^N)$, wherein N denotes the number of pixels (or blocks) in an image. The quantity $(\Sigma_{i=1}^N |I_1^i - I_2^i|)/N$ measures the distance between $(I_1, I_2)$. However, this distance measure is not robust, in that outlying pixels (or blocks) can distort the distance measure arbitrarily. It is also not robust to nonlinear intensity variations at corresponding pixels.

To avoid this substantial problem, the use of ordinal measures for stereo image matching was proposed. In such use, the ordinal variable is drawn from a discrete ordered set, such as school grades. The ratio between two measurements is not of importance; only their relative ordering is relevant. The relative ordering between measurements is expressed by their ranks. A rank permutation is obtained by sorting the measurements in ascending order and labeling them using integers [1,2,3, . . . , N], N denoting the number of measurements. An example of using ordinal measures is as follows: an image is partitioned into 3×3 equal-sized blocks, as shown in FIG. 1(a) which makes the system independent of input image sizes, and the 3×3 sub-image is calculated by taking the average intensity value of each block. The average values for the blocks are shown in FIG. 1(b). This array is then converted to a rank matrix as shown in FIG. 1(c). Suppose that the average intensity values in FIG. 1(b) are increased by 10 in the copied image so its sub-image has values: {{74, 71, 56}, {145, 156, 126}, {195, 184, 155}}. The rank matrix is not sensitive to the intensity value changes, and thus perfect matching with original image can be achieved.

Since it was first proposed for stereo image matching, the ordinal measure of pixel (or block) values has shown promising results on image/video matching. In one such matching method, each image frame is partitioned into 3×3 blocks, and the ordinal measure for each block is computed. This ordinal measure is referred to as a fingerprint. Then the sequences of fingerprints are compared for video sequence matching. Comparing this technique with techniques using motion signature and color signature, it was shown that matching by ordinal signature had the best performance, followed by the motion signature. Matching on the basis of color signature had the worst performance. An adaptation of this measure has been successfully used for image copy detection, and it was shown that the ordinal measures were very robust to various signal modifications.

However, there are two issues concerning the performance of this adaptation: its robustness and discriminability. Robustness determines the amount of data inconsistency that can be tolerated by the system before mismatches begin to occur, while the discriminability is concerned with its ability to reject irrelevant data such that false detections do not occur. A critical factor balancing between those conflicting issues is the number of partitions. As might be expected, the system becomes more robust as the number of partitions is reduced. Conversely, the discriminability becomes higher as the number of partitions increases.

While much work has been done in the field of video copy detection, further work is required, in particular further consideration of the issues of discriminability and partitioning, in designing a more robust video copy detection scheme.

OBJECTS AND SUMMARY OF THE INVENTION

Accordingly, it is an object of this invention to provide a video-copy-detection algorithm that includes a spatial matching technique that is based on ordinal measures of a small number of partitioned image frames, but includes a second matching step to compensate for the lower discriminability that results from the small number of partitions.

It is another object of this invention to provide a video-copy-detection algorithm that is robust to a wide variety of modifications and distortions, and is also able to handle static video without compromising performance.

According to one aspect of the invention, a method for detecting whether all or a portion of target video data containing a plurality of frames and sub-sequences matches query video data is provided. The method comprises (a) calculating a first distance between the query video data and a specified one of the sub-sequences of the target video data. If it is determined that the first distance is less than a first threshold, a second distance between the query video data and the specified sub-sequence is calculated; otherwise, a relatively large value is assigned to the second distance. These calculations are repeated for each sub-sequence of the target video data to generate a first and second distance relative to the query video data for each sub-sequence of the target video data. The method further comprises finding local minima from among the second distance values, and performing copy detection based on the local minima found.

Preferably, performing the copy detection involves comparing each local minimum with a second threshold, and determining which, if any, of the local minima is/are less than the second threshold.

Also, the calculation of each of the first and second distances is preferably based on a 2×2 partitioning of each of the frames in the query video data and the target video data.

Preferably, the method is robust to select modifications applied to one or more frames of the target video data, the select modifications including display format conversion, pixel level boost, and histogram equalization.

In accordance with another invention, any of the above-described methods or step(s) thereof may be performed in response to execution of a program of instructions (e.g., software) by a computer, printer/copier, or other processor-controlled device. Alternatively, the program of instructions may be implemented using functionally equivalent hardware (e.g., ASIC, digital signal processing circuitry, etc.) or a combination of software and hardware.

According to a further aspect of the invention, a device for performing the above-described copy detection is provided. The device comprises one or more components or modules to perform the processing. Such component(s) and/or module(s) may be implemented in hardware, software, or combination thereof.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings like reference symbols refer to like parts.

FIG. 1(a) shows an image partitioned into 3×3 equal-sized blocks; FIG. 1(b) shows the average intensity value for each block; and FIG. 1(c) shows the rank matrix of the values in FIG. 1(b).

FIG. 2 shows a series of video frames, including (a) an original image (video frame) and various modifications: (b) the image with its pixel level boosted by 50, (c) a histogram-equalized version of the image, (d) the image reformatted to "letter-box" style, and (e) the image (a 4:3 picture) shown on a 16:9 screen for a "pillar-box" effect.

FIG. 3(a)-1-3(a)-3 show an image and its intensity distributions for 2×2 and 3×3 partitions of the image respectively.

FIG. 3(b)-1-3(b)-3 show the image reformatted to "letter-box" style and its intensity distributions for 2×2 and 3×3 partitions of the reformatted image respectively.

FIG. 4 illustrates five sequences of static video clips: (a), (b), (c), (d) and (e), each containing three frames, which are used for comparison purposes in describing embodiments of the video-copy-detection algorithm of the present invention.

FIGS. 5(a)-1-5(a)-5 illustrate the 2×2 partitions of the frames in sequences (a)-(e) at $t_1$.

FIGS. 5(b)-1-5(b)-5 illustrate the rank matrices of the 2×2 partitions of FIGS. 5(a)-1-FIG. 5(a)-5.

FIGS. 5(c)-2-5(c)-5 illustrate the absolute-difference-to-the-mean matrices of the 2×2 partitions of FIGS. 5(a)-2-FIG. 5(a)-5.

FIGS. 5(d)-2-5(d)-5 illustrate the rank matrices of the matrices of FIGS. 5(c)-2-5(c)-5.

FIGS. 5(e)-2-5(e)-5 illustrate the matching results with respect to the sequences shown in FIG. 4.

DESCRIPTION OF THE PREFERRED EMBODIMENTS

Overview

Figure 5:
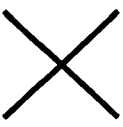

The video-copy-detection algorithm of the present invention is an improvement on the video copy detection scheme disclosed and claimed in related application Ser. No. 10/778,464. The algorithm of the present invention includes a two-step spatial matching technique that uses ordinal signatures of frame partitions and their differences from partition mean values to improve the effectiveness of video copy detection, particularly for static video. The algorithm is effective regardless of the dynamics of the video shot and is also robust to a wide range of modifications and distortions that a video signal may undergo, including changes in brightness, color, frame format, as well as different blocky artifacts. The algorithm is also able to effectively cope with various display format conversions, including the conversions depicted in FIGS. 2(b)-(e) with respect to the original video frame shown in FIG. 2(a). The image in FIG. 2(b) has had its pixel level boosted by 50, and the image in FIG. 2(c) has been histogram-equalized. FIGS. 2(d) and 2(e) depict conversions into "letter-box" and "pillar-box" display formats respectively. The pillar-box format is a result of a 4:3 image shown on a 16:9 screen.

Indeed, the interplay between the partitioning and display format conversion is quite critical, as the inventor has discovered. For example, assume a 4:3 video frame, as shown in FIG. 3(a)-1, is converted to the letter-box format, shown in FIG. 3(b)-1. The ordinal measures are invariant when the partitions are 2×2, since changes in the partition values are symmetric, as can be seen by comparing the intensity distribution of FIG. 3(a)-2 with that of FIG. 3(b)-2. However, when the number of partitions is increased to 3×3, the asymmetrical changes will induce variations in ordinal measures, as can be seen by comparing the intensity distribution of FIG. 3(a)-3 with that of FIG. 3(b)-3.

Algorithm

Notation

The notations and the similarity measures used herein are defined as follows. $V=<V[0], \ldots, V[n-1]>$ denotes a video sequence with n frames, and $V[i]=<V^1[i], \ldots, V^m[i]>$ denotes the $i^{th}$ frame with m partitions. $\hat{V}[i]$ denotes a mean value of m partitions in the $i^{th}$ frame. A sub-sequence of V is defined as $V[p:p+N-1]$, in which the number of frames is N and the first frame is $V[p]$, $0 \leq p \leq n-N$.

The problem of video copy detection is defined as that of determining if a copy for a given video clip appears in the target video, and if so, at what location. Formally, given a query video clip $V_q=<V_q[0], \ldots, V_q[N-1]>$ and a target video $V_t=<V_t[0], \ldots, V_t[M-1]>$, $N<<M$, a sub-sequence $V_t[p:p+N-1]$ from the target video is a copy of the query video if the dissimilarity between the two, defined by $D(V_q, V_t[p:p+N-1])$, is less than a noise threshold $\epsilon$. The dissimilarity measures D ( ) are defined and explained in more detail below.

First Spatial Matching Step Using Ordinal Measures

Let the [1×m] rank matrix of the $i^{th}$ frame of the query video $V_q[i]$ be $\pi_{q,i}$ and that of $i^{th}$ frame of the target sub-sequence $V_t[p:p+N-1]$ be $\pi_{t,p+i}$, $0 \leq i \leq N-1$. Then, the spatial distance between two such image frames is defined as:

$$d(\pi_{q,i}, \pi_{t,p+i}) = \frac{1}{C} \sum_{j=1}^{m} |\pi_{q,i}^j - \pi_{t,p+i}^j|, \quad (1)$$

where $d(\pi_{q,i}, \pi_{t,p+i})$ is the normalized distance between the two rank matrices and C is the maximum distance between two rank matrices $\pi_i$ and $\pi_j$, $\forall (\pi_i, \pi_j) \in S_m$. C is obtained when the two permutations are the reverse of each other, and $S_m$ is the set of all possible rank matrices with size m. In a preferred embodiment, m=4; thus C=8.

Then, the spatial dissimilarity between two sequences $D_{S_1}(V_q, V_t[p:p+N-1])$ is computed by averaging over N dissimilarities as follows:

$$D_{S_1}(V_q, V_t[p:p+N-1]) = \sum_{i=0}^{N-1} d(\pi_{q,i}, \pi_{t,p+i})/N. \quad (2)$$

Advantageously, this measure uses 2×2 partitions, instead of 3×3 partitions.

A pictorial understanding of image frames, their respective 2×2 partitions, and the respective rank matrices thereof is provided in FIGS. 4, 5(a), and 5(b). Consider the five static video clips illustrated in FIG. 4: (a), (b), (c), (d), and (e), each consisting of three frames at times $t_1$, $t_{25}$ and $t_{50}$, respectively, sequence (d) being a histogram-equalized version of sequence (c), and sequence (e) being a display-format-converted version of sequence (c). FIGS. 5(a)-1-5(a)-5 show the 2×2 partitions of the $t_1$ frames in FIGS. 4(a)-1-4(a)-5, respectively, and FIGS. 5(b)-1-5(b)-5 respectively show the rank matrices of those partitions.

Second Spatial Matching Step to Increase Discriminability

The ordinal measure of 2×2 partitions provides the algorithm of this invention with robustness to various display format conversions, as well as to signal modifications. In order to offset the lowered discriminability that may result from adoption of this small number of partitions, the algorithm selectively employs a two-step spatial matching technique. For sequences having a dissimilarity, as determined by eq. (2), that is less than a predefined threshold, a second matching is conducted. In this second matching step, a rank matrix of differential values $\gamma_i$ defined as: $\gamma_i=[(V_i^1-\hat{V}_i), \ldots, (V_i^m-\hat{V}_i)]$ is determined for each sequence or sub-sequence being subjected to comparison. FIGS. 5(c) and (d) provides a pictorial understanding of this aspect of the invention. Absolute-difference-to-the-mean matrices of the 2×2 partitions of FIGS. 5(a)-2-FIG. 5(a)-5 (which have mean values of 60, 91, 127 and 73, respectively) are shown in FIGS. 5(c)-2-5(c)-5, respectively. The corresponding rank matrices of the differential value matrices are shown in FIGS. 5(d)-2-5(d)-5.

The result of each comparison in the second matching step between a query video clip $V_q$ with N frames and a sub-sequence $V_t[p:p+N-1]$ of a target sequence $V_t$ is expressed by a normalized distance as follows:

$$D_{S_2}(V_q, V_t[p:p+N-1]) = \frac{1}{mN} \sum_{i=1}^{N} \left( \sum_{j=1}^{m} (\gamma_{q,i}^j - \gamma_{t,p+i}^j) \right) \quad (3)$$

Algorithm Operations

Figure 6:
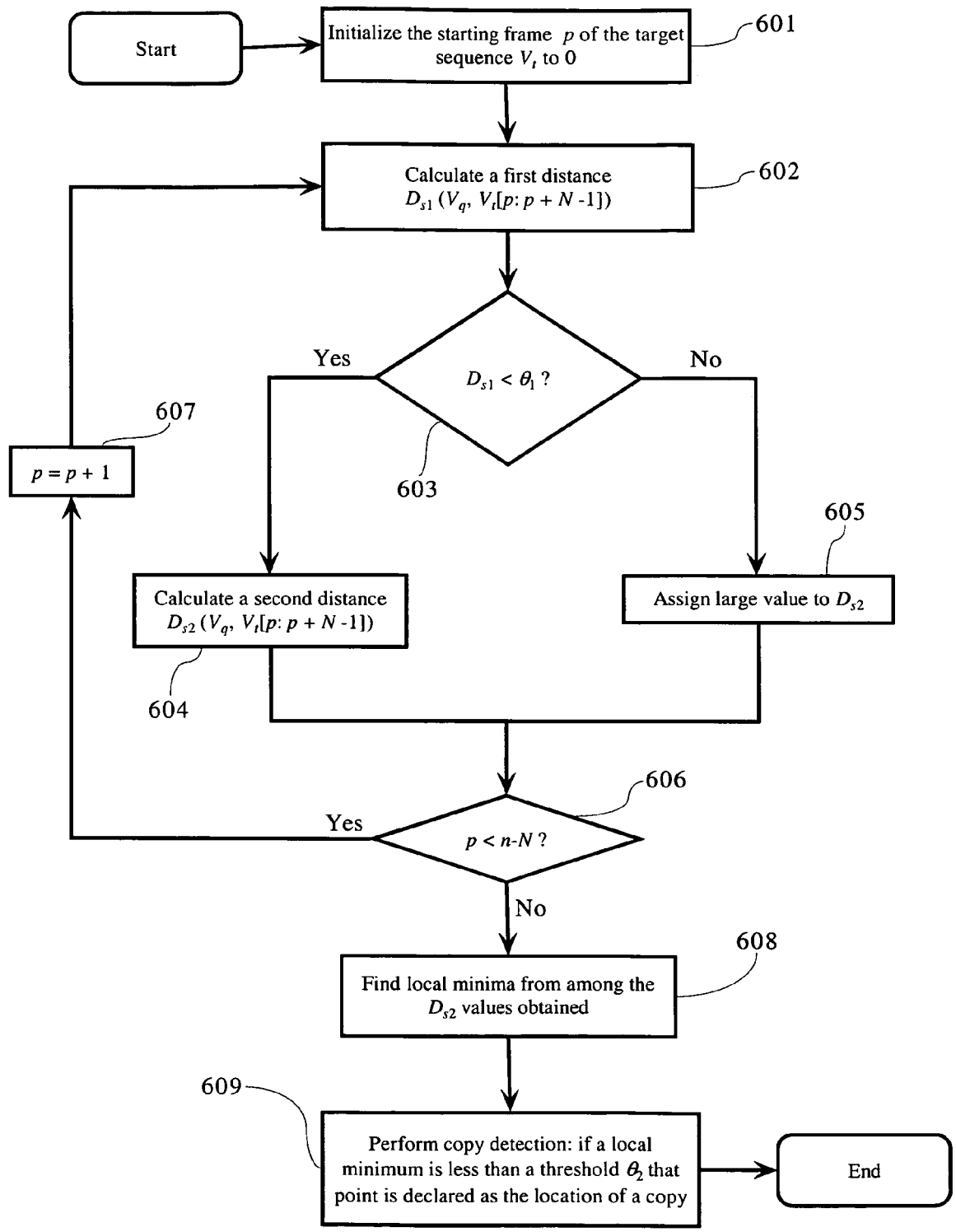
FIG. 6 is a flow diagram illustrating the operations of a video-copy-detection algorithm according to embodiments of the present invention.

The overall matching process is illustrated in the flow chart of FIG. 6, which begins by setting p to be 0 in step 601. The variable p denotes the starting frame of the sub-sequence under test and p+N−1 denotes the ending frame of that sub-sequence. Next, a first distance between a first N frame sub-sequence of the n frame target video sequence (n>N) and the N frame query video sequence $D_{S_1}(V_q, V_t[p:p+N-1])$ is computed (step 602). In step 603, this first distance is compared with a predefined threshold value $\theta_1$. If the first distance is less than $\theta_1$, the algorithm proceeds to step 604 in which a second distance $D_{S_2}(V_q, V_t[p:p+N-1])$ is computed; otherwise, a large value is assigned to $D_{s_2}(V_q,V_t[p:p+N-1])$ in step 605. In either case, the algorithm then proceeds to step 606, where it is determined if p<n−N. If so, p is increased by 1 in step 607, after which the algorithm loops back to step 602. This loop in which a first distance is computed and a second distance is either computed or assigned to each $(V_q,V_t[p:p+N-1])$ pair is repeated until p=n−N, in which case the loop is exited. Next, in step 608, the algorithm finds local minima from among the $D_{s_2}$ values obtained. Copy detection is then determined in step 609 as follows: if a particular local minimum is less than a predefined threshold value $\theta_2$, the corresponding sub-sequence in the target sequence is declared as the location of a copy.

A pictorial illustration regarding the overall process of image frame matching, as described above, is shown in FIGS. 4 and 5. Determining video matching relies on combination of frame dissimilarities as expressed in eqs. (2) and (3).

Applications and Implementations

Figure 7:
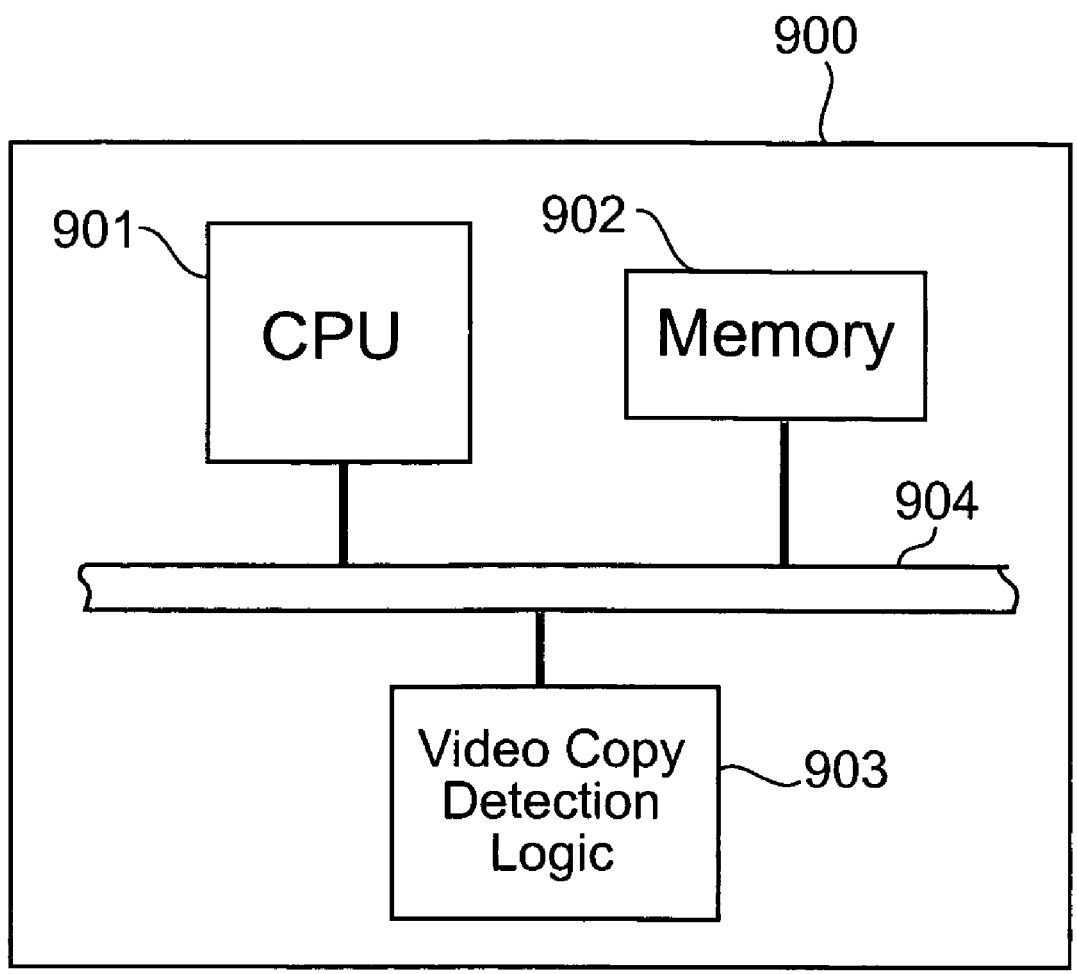
FIG. 7 is a block diagram of an exemplary video copy detection system according to embodiments of the present invention.

Having described a content-based copy detection algorithm in accordance with the present invention, the discussion now turns to some of the different ways the algorithm can be implemented and different applications in which the algorithm can be employed. In one such implementation, illustrated in FIG. 7, a video copy detection system 900 includes a central processing unit (CPU) 901, and system memory 902, which may be in the form of RAM and ROM. A video copy detection module 903 that the logic for detecting copies of video clips in accordance with any of the embodiments of the algorithm described above is also included. All major components are interconnected by bus 904.

Module 903 may be implemented in the form of hardware, for example, as an integrated circuit, e.g., an application specific integrated circuit (ASIC), embodied on a board or adapter card. Alternatively, the video copy detection module 903 may represent software that resided on system, 900, say, in a hard drive or other storage device (including the ROM of system memory 902) to which software can be conveyed to the system. More broadly, such software is embodied on a suitable device-readable medium, e.g., a compact disc, electromagnetic carrier wave, ROM, etc. that communicates with the system bus 904 directly or through the appropriate device, e.g., hard drive, disc drive, network port, etc. Thus, software specifying an algorithm of the invention may be transmitted over a network, such as the Internet, or wirelessly transmitted between devices.

The video copy detection system itself may be embodied in any number of devices, including hand-held devices, desk top/lap top computers, etc.

In addition to having different implementations, a video-copy-detection algorithm of the present invention can also be employed in a variety of applications. Such an algorithm can be employed in connection with a multimedia search engine to improve its retrieval efficiency by detecting and removing copies from the retrieval results before the search results are displayed. Eliminating redundant results reduces the frustration of having to browse through a large number of search results that are essentially the same, and thus provides the user with a more enjoyable browsing experience. The content-based copy detection algorithm of this invention could also be used for media tracking, that is, keeping track of when and where a particular known piece of media has been used. Monitoring a particular TV commercial for market research is a specific application of media tracking. For example, a marketing person might want to know when and how many times, and on which channel, a competitor's commercial is aired. From this information, useful insights regarding the competitor's marketing strategy can be obtained. Another media tracking application is managing rights and royalty payments.

Accordingly, as will be appreciated from the foregoing, the present invention provides an efficient video-copy-detection algorithm that includes a spatial matching technique that is based on ordinal measures of a small number of partitioned image frames, and further includes a second matching step to compensate for the lower discriminability that results from the small number of partitions. The algorithm is effective in handling not only intensity and color variation, but also various format conversions, thereby providing increased robustness regardless of the video dynamics in the shots. The algorithm may be embodied in a variety of different environments, as explained above. Within any of those environments, the algorithm may be implemented as software that controls the functions of the various components/modules involved in the processing. The equivalent of software-based instructions may also be realized, for example, using ASIC (s), digital signal processing circuitry, or the like. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. Also, the "one or more components or modules" referred to in the claims covers any appropriately software or hardware that is capable of performing the functions recited. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method using a central processing unit for detecting whether all or a portion of target video data containing a plurality of frames and sub-sequences matches query video data, the method comprising the steps of:
   (a) calculating using the central processing unit a first distance between the query video data and a specified one of the sub-sequences of the target video data, wherein the first distance is based on a distance between a first rank matrix of a frame of the query video data and a second rank matrix of a frame of the sub-sequences of the target video data, the first rank matrix is based on a 2×2 partition of a frame of the query video data, the second rank matrix is based on a 2×2 partition of a frame of the sub-sequences of the target video data, each element of the first and second rank matrix is related to a rank of a partition in a particular frame relative to the other partitions in the particular frame;
   (b) determining using the central processing unit if the first distance is less than a threshold; if so, calculating a second distance between the query video data and the specified sub-sequence of the target video data, wherein the second distance is based on the distance between a third rank matrix of a frame of the query video data and a fourth rank matrix of a frame of the sub-sequences of the target video data, the third rank matrix is based on differential values of a frame of the query video data, the fourth rank matrix is based on differential values of a frame of the sub-sequences of the target video data, otherwise, assign a value greater than said threshold that exceeds a corresponding value of the second distance;

(c) repeating, using the central processing unit, steps (a) and (b) for each sub-sequence of the target video data;

(d) finding, using the central processing unit, a local minima from among the second distance values in the central processing unit; and (e) performing copy detection based on the local minima found.

2. A method as recited in claim 1, wherein step (e) comprised comparing each local minimum with a second threshold, and determining which, if any, of the local minima is/are less than the second threshold.

3. A method as recited in claim 1, wherein the calculation using the central processing unit of the first and second distances in steps (a) and (b) respectively are each based on a 2×2 partitioning of each of the frames in the query video data and the target video data.

4. A method as recited in claim 1, wherein the detection using the central processing unit, is robust to select modifications applied to one or more frames of the target video data, the select modifications including display format conversion, pixel level boost, and histogram equalization.

5. A computer-readable storage medium embodying a program of instructions for directing a device to perform the method recited in claim 1.

6. A device configured to perform the method recited in claim 1, wherein the device comprised a central processing unit and a system memory.

* * * * *

UNITED STATES PATENT AND TRADEMARK OFFICE
CERTIFICATE OF CORRECTION

PATENT NO.        : 7,486,827 B2                                              Page 1 of 1
APPLICATION NO.   : 11/040569
DATED             : February 3, 2009
INVENTOR(S)       : Changick Kim It is certified that error appears in the above-identified patent and that said Letters Patent is hereby corrected as shown below:

Column 9, line 15, please change "comprised" to --comprises--

Signed and Sealed this

Twelfth Day of May, 2009

JOHN DOLL
*Acting Director of the United States Patent and Trademark Office*